408-111. 04 RE06158 EX

J. STRICKLER.

Boring-Machines.

No. 6,158. Reissued Dec. 1, 1874.

Witnesses:
A. C. Johnston
James J. Johnston Jr

Inventor:
Joseph Strickler
By J. J. Johnston his attorney

THE GRAPHIC CO. PHOTO-LITH. 39 & 41 PARK PLACE, N.Y.

UNITED STATES PATENT OFFICE.

JOSEPH STRICKLER, OF COLUMBIANA, OHIO, ASSIGNOR TO WILLIAM W. WALLACE, OF PITTSBURG, PENNSYLVANIA.

IMPROVEMENT IN BORING-MACHINES.

Specification forming part of Letters Patent No. 142,296, dated August 26, 1873; reissue No. 6,158, dated December 1, 1874; application filed October 24, 1874.

*To all whom it may concern:*

Be it known that I, JOSEPH STRICKLER, of Columbiana, in the county of Columbiana and State of Ohio, have invented a new and useful Improvement in Boring-Machine for Wood, (being the same device as that for which I made application for Letters Patent May 18, 1852, the present being a renewal of application for the same invention;) and I do hereby declare that the following is a full and exact description thereof, reference being had to the accompanying drawings, and to the letters of reference marked thereon.

The nature of my invention consists in the combination and arrangement of the several parts hereinafter described.

To enable others skilled in the art to make and use my invention, I will proceed to describe more fully its construction and operation.

Figure 1:
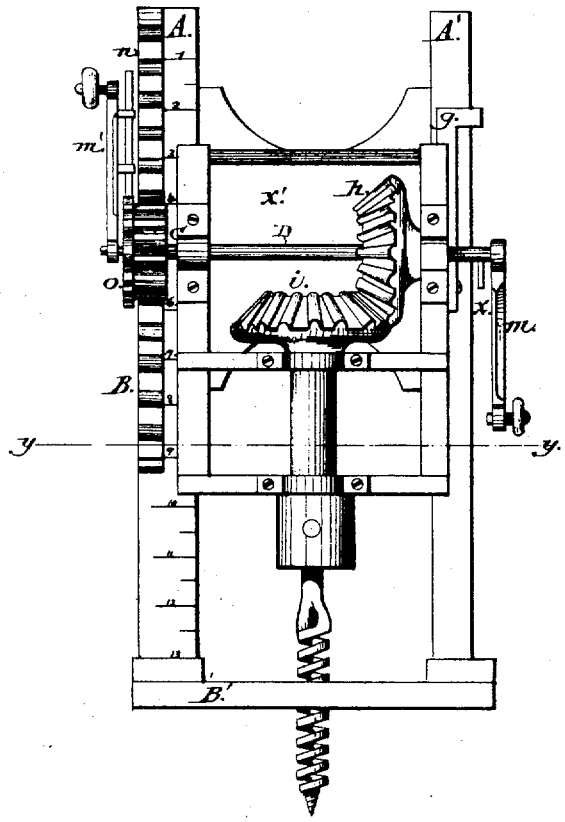
Figure 2:
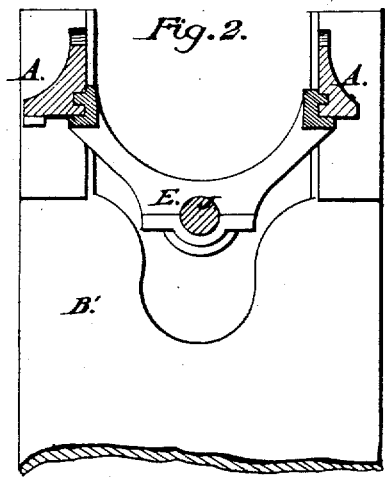

In the accompanying drawings, which form part of my specification, Figure 1 is a front elevation of my improvement in boring-machine. Fig. 2 is a transverse section of the same at line *y* of Fig. 1.

In the accompanying drawings, B′ represents the base of the machine, to which are attached, in a vertical position, slides A and A′, which are cast in one piece, the web *x′* connecting them together. The slide A is provided with a rack, B, and a measuring-scale, to indicate the depth the auger has entered the wood. The slide A′ is provided with a spring-catch, *g*, for holding the gate E in an elevated position. The gate E is fitted to the slides, as clearly indicated in Fig. 2. The shaft D is fitted in suitable bearings in the gate E, and is provided with cranks *m* and *m′*, and wheels C and *h*, the wheel C, with its flange *o*, being loose on the shaft, and the wheel *h* being the driving-wheel, which gears into the wheel *i* on the upper end of the auger-shaft J, which has its bearings in the gate E. The driving-shaft D is provided with a pin, *x*, which is for the purpose of throwing back the spring *g*, which will allow the gate E to move down with the action of the auger. The gate is elevated by simply pushing down the rod *n* so that it will catch in the notches in flange *o* of the loose wheel C. This will hold the wheel in a fixed position with relation to shaft D, the rotating of which will, through the medium of the wheel C and rack B, elevate the gate E. By this combination and arrangement of the parts hereinbefore described, the gate E and its auger-shaft J are depressed and elevated without any reverse motion of the cranks *m* and *m′*.

The operation of my improvement will readily be understood by the skillful mechanic without further description.

Having thus described the nature, construction, and operation of my improvement, what I claim as of my invention is—

1. The sash or gate E and vertical slide A, provided with rack B, in combination with a loose pinion and latch or rod *n*, substantially as herein described.

2. The spring-catch *g*, combined with the gate E and vertical slide A, to hold the gate, and automatically release it by the pin *x* on shaft D, as herein described.

JOSEPH STRICKLER.

Witnesses:

J. D. JONES,

W. J. HOWARTH.